(12) United States Patent
Beranek et al.

(10) Patent No.: US 12,325,097 B2
(45) Date of Patent: *Jun. 10, 2025

(54) METHOD AND APPARATUS FOR MAINTAINING A SURFACE SPEED OF A CIRCULAR CUTTING DEVICE

(71) Applicant: Illinois Tool Works Inc., Glenview, IL (US)

(72) Inventors: Sarah Marie Beranek, Glenview, IL (US); John Edward Bussan, Buffalo Grove, IL (US); Douglas A. Ceckowski, Gurnee, IL (US); Christian Chkaiban, Glenview, IL (US); Chelsea B. Frid, Chicago, IL (US); Jeffrey E. Joray, Lake Villa, IL (US); Michael E. Keeble, Libertyville, IL (US); Bryan J. Kordus, Mount Pleasant, IL (US); Michael Shtilman, Buffalo Grove, IL (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/509,714

(22) Filed: Nov. 15, 2023

(65) Prior Publication Data

US 2024/0109159 A1 Apr. 4, 2024

Related U.S. Application Data

(63) Continuation of application No. 16/512,655, filed on Jul. 16, 2019, now Pat. No. 11,833,632.

(Continued)

(51) Int. Cl.
*B23Q 15/10* (2006.01)
*B23Q 15/16* (2006.01)

(Continued)

(52) U.S. Cl.
CPC ............. *B23Q 15/10* (2013.01); *B23Q 15/16* (2013.01); *B26D 1/0006* (2013.01); *G01B 11/10* (2013.01);

(Continued)

(58) Field of Classification Search
None
See application file for complete search history.

(56) References Cited

U.S. PATENT DOCUMENTS 3,560,826 A 2/1971 Lonaberger
11,833,632 B2 * 12/2023 Beranek ................. B23Q 15/10

(Continued)

FOREIGN PATENT DOCUMENTS

CN 101311854 A 11/2008
CN 102275132 A 12/2011

(Continued)

OTHER PUBLICATIONS

Int'l Search Report and Written Opinion AppIn No. PCT/US2019/042177 mailed Jan. 23, 2020.

(Continued)

*Primary Examiner* — Ryan A Jarrett
(74) *Attorney, Agent, or Firm* — McAndrews, Held & Malloy, Ltd.

(57) ABSTRACT

Provided is a disclosure for a cutting device configured to control a linear speed of a cutting wheel as the cutting wheel gets smaller with use. In one example, the cutting device includes a cutting wheel; an actuator to rotate the cutting wheel; a power source configured to provide power to the actuator for rotating the cutting wheel at an adjustable rotational velocity; and control circuitry configured to adjust the rotational velocity of the cutting wheel to maintain a substantially constant surface speed.

17 Claims, 8 Drawing Sheets

Related U.S. Application Data

(60) Provisional application No. 62/699,809, filed on Jul. 18, 2018.

(51) Int. Cl.
  *B26D 1/00* (2006.01)
  *G01B 11/10* (2006.01)
  *G05B 19/416* (2006.01)

(52) U.S. Cl.
  CPC .... *G05B 19/416* (2013.01); *B26D 2001/0046* (2013.01)

(56) References Cited

U.S. PATENT DOCUMENTS

2005/0286875 A1  12/2005  Haller
2015/0148937 A1  5/2015   Wolf

FOREIGN PATENT DOCUMENTS

CN  104395031 A  3/2015
KR  101479497 B1  1/2015

OTHER PUBLICATIONS

The extended European search report for Application No. 19746406.8, dated Dec. 6, 2023, European Patent Office, Germany (9 pages).

* cited by examiner

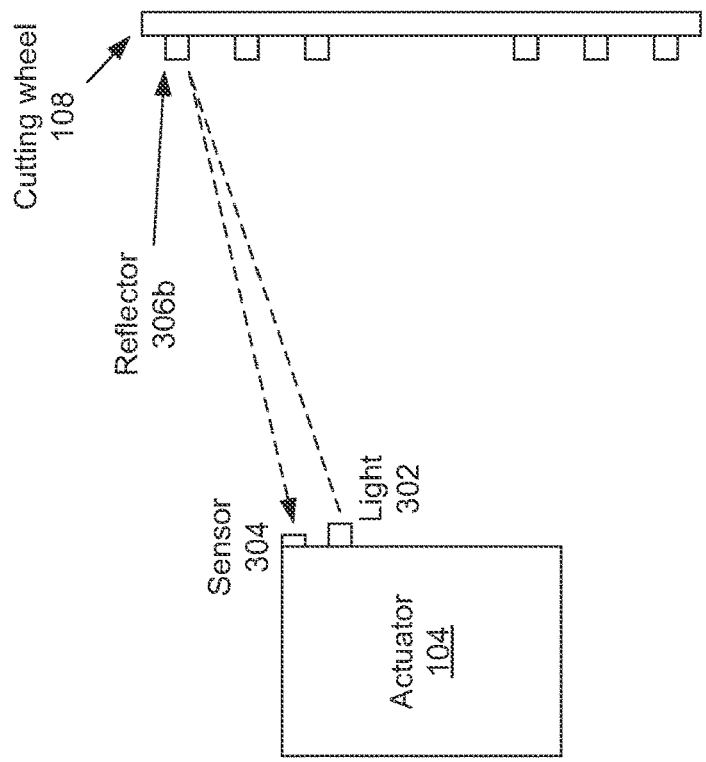
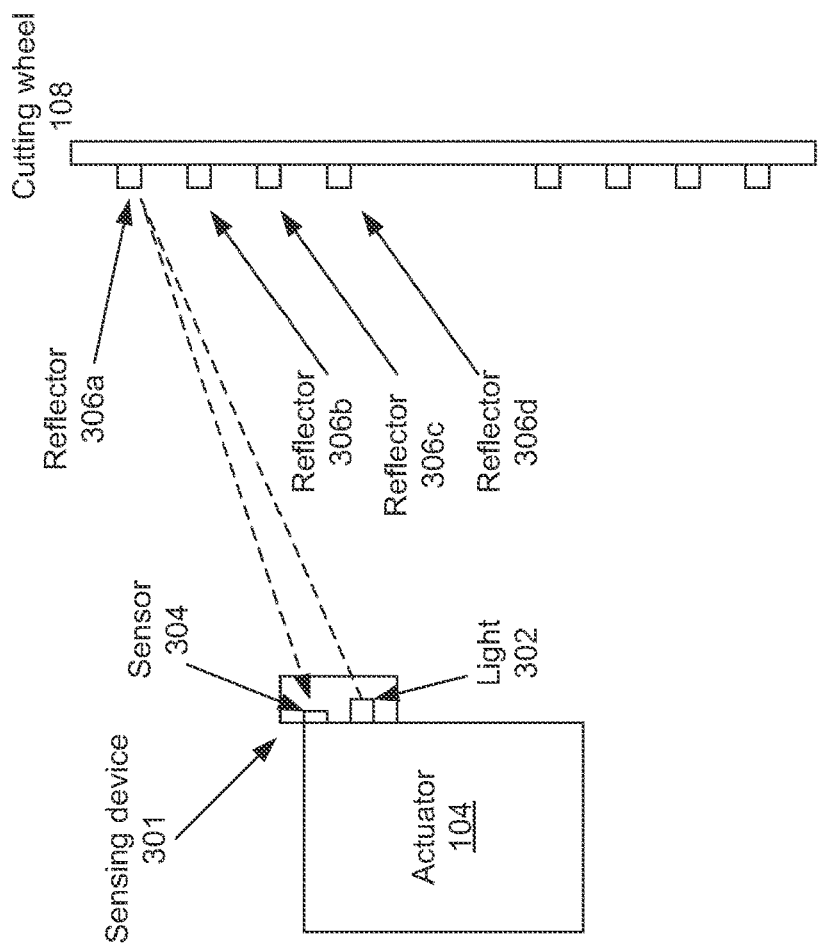
FIG. 3B
FIG. 3A

METHOD AND APPARATUS FOR MAINTAINING A SURFACE SPEED OF A CIRCULAR CUTTING DEVICE

RELATED APPLICATIONS

The present application claims priority to U.S. Provisional patent application Ser. No. 16/512,655, filed Jul. 16, 2019, and entitled "Method and Apparatus for Maintaining a Surface Speed of a Circular Cutting Device," which claims priority to the U.S. Provisional Application 62/699,809, filed on Jul. 18, 2018, titled "Method and Apparatus for Maintaining a Surface Speed of a Circular Cutting Device," the disclosures of which are incorporated by reference.

BACKGROUND

The present disclosure relates to a circular cutting device, and more particularly, to a method and apparatus for maintaining a surface speed of a circular cutting device.

Limitations and disadvantages of conventional approaches to providing a circular cutting device will become apparent to one of skill in the art, through comparison of such approaches with some aspects of the present method and system set forth in the remainder of this disclosure with reference to the drawings.

SUMMARY

Methods and apparatus are provided for controlling a surface speed of a circular cutting device, substantially as illustrated by and described in connection with at least one of the figures, and as set forth more completely in the claims.

BRIEF DESCRIPTION OF THE DRAWINGS

These and/or other aspects will become apparent and more readily appreciated from the following description of the exemplary embodiments, taken in conjunction with the accompanying drawings.

FIGS. 3A to 3H illustrate example methods to detect a size of a cutting wheel in accordance with aspects of this disclosure.

DETAILED DESCRIPTION

Figure 1:
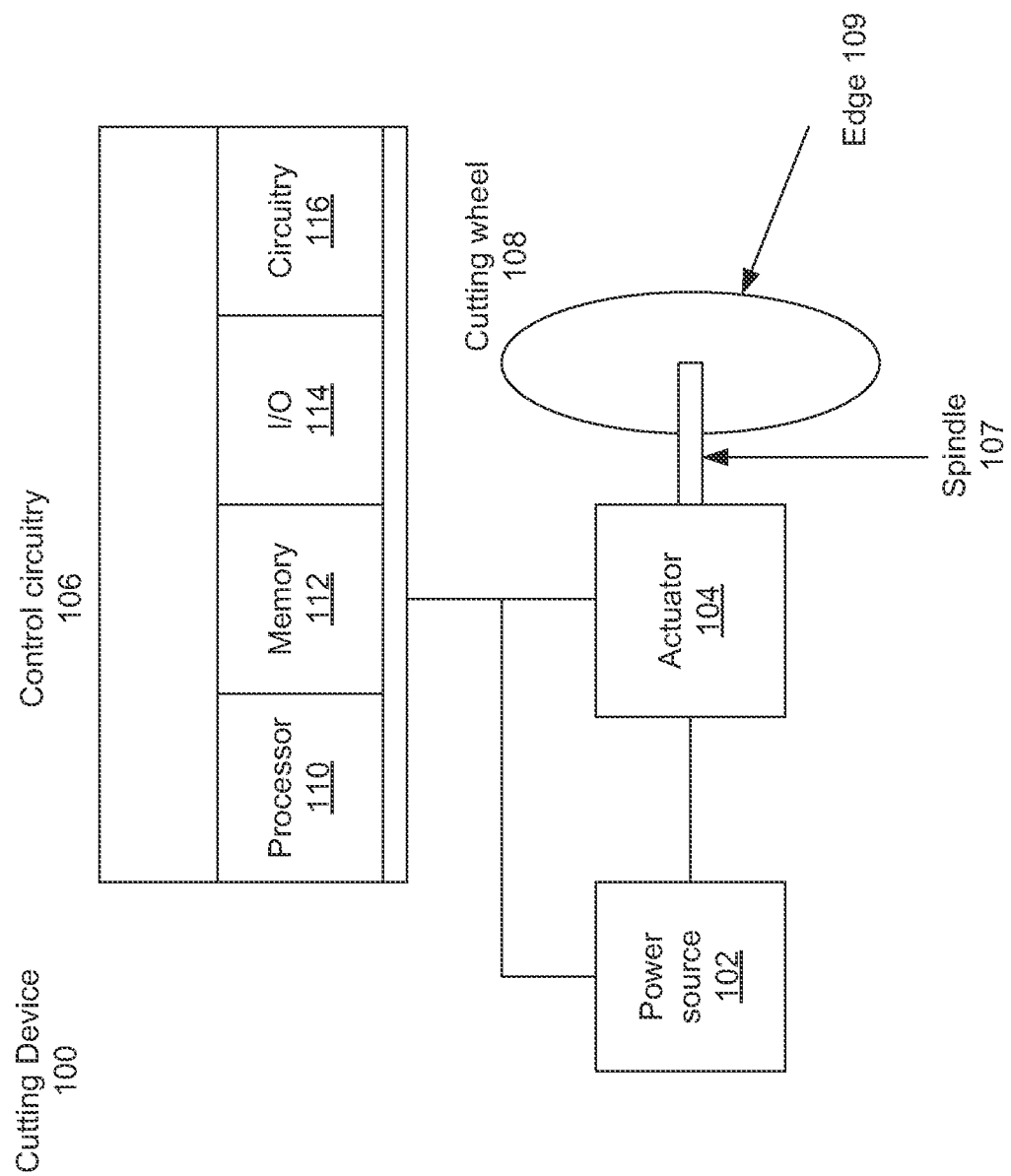
FIG. 1 illustrates a block diagram of an example cutting device in accordance with aspects of this disclosure.

While example methods and apparatus are disclosed, modifications to the example methods and apparatus may not be described in detail as they may be well known to a person of ordinary skill in the art.

Abrasive cutting devices are used to perform sectioning, which can be used for testing of components. Abrasive cutting devices generally have circular cutting wheels that are rotated at high speed to section a part. As the abrasive device is used, the abrasive cutting wheel is consumed and the diameter of the abrasive cutting wheel decreases as the cutting wheel is worn down. The speed of the cutting wheel edge may impact the quality of the cut. Disclosed example methods and apparatus automatically adjust the rotational velocity (e.g., in rotations per minute (RPM)) of the cutting wheel to compensate for the reduction in the cutting wheel diameter, thereby providing a more consistent edge speed and improved consistency in cutting results.

When a new abrasive cutting wheel is added, the rotational velocity is set to a predetermined starting value. In some examples, the cutting device may determine the starting value for a new cutting wheel and/or the increase in rotational velocity based on one or more of: the sample material being cut, a part number of the material being cut, an abrasive material type on the abrasive cutting wheel, an abrasive cutting wheel size, a concentration of the abrasive material on the abrasive cutting wheel, a thickness of the abrasive cutting wheel, a bonding agent material type, and/or a bonding agent material hardness. The predetermined starting value and/or the increase in rotational velocity may be empirically determined and stored in the cutting device (e.g., in a lookup table). In some examples, the abrasive cutting wheel and/or one or more qualities of the abrasive cutting wheel are determined by reading electronic indicia (e.g., a barcode, a quick response (QR) code, an RFID tag, a near field communications (NFC) tag, etc.) attached to the cutting wheel or the packaging of the cutting wheel. For example, the cutting device may include a barcode reader, a QR code reader, an RFID reader, and/or an NFC reader configured to determine the type of abrasive cutting wheel by reading the electronic indicia.

As an abrasive cutting wheel is used, disclosed example cutting devices increase the rotational velocity of the cutting wheel to maintain a substantially consistent surface speed (e.g., in surface feed per minute) of the outer edge of the abrasive cutting wheel and/or to reduce a rate at which the surface speed decreases (e.g., relative to maintaining a constant angular velocity as with conventional cutting devices).

Disclosed example methods and apparatus provide improved cut quality and consistency, particularly closer to the end of life of the abrasive cutting wheel. Disclosed example methods and apparatus may also improve the life of abrasive cutting wheel by operating the cutting wheel within the highest performance envelope for longer than conventional abrasive cutting devices. While the disclosed examples are described with reference to abrasive cutting devices and abrasive cutting wheels, the disclosed methods and apparatus may be modified and/or used for any other type of cutting device, such as rotary tools and/or any other type of rotational cutting device that uses consumable cutting wheels.

FIG. 1 illustrates a block diagram of an example cutting device in accordance with aspects of this disclosure. Referring to FIG. 1, there is shown a cutting device 100 including a power source 102, a actuator 104, control circuitry 106, and a cutting wheel 108.

The power source 102 may be any power source that can be used by the actuator 104 to rotate the cutting wheel 108. For example, the power source 102 may be an electric power source that provides appropriate current and voltage to the actuator 104, where the actuator 104 may be a variable speed electric motor that rotates the cutting wheel 108 via, for example, the spindle 107. Another power source may be, for example, an air compressor that may provide compressed air for the actuator 104 that runs on compressed air. Still another power source may be, for example, a hydraulic power source that provides hydraulic fluid for the actuator that runs on hydraulic fluid. Accordingly, the power source 102 may be any power source that can be used by an appropriate actuator 104 such that the cutting wheel 108 can be rotated at various desired speeds, including those power sources that are not mentioned in this disclosure.

The example control circuitry 106 of FIG. 1 may include analog and/or digital circuitry configured to determine a target rotational velocity (revolutions per minute—RPM) an/or a target surface speed of the cutting wheel 108, and provide control signals to the power source 102 and/or the actuator 104 to rotate the cutting wheel at the target rotational velocity. For example, when the actuator 104 is an electric motor such as, for example, a servo motor, a stepper motor, etc., the power source 102 may provide power to the actuator 104, and the control circuitry 106 may provide control signals (analog and/or digital) to control the voltage provided by the power source 102 to the actuator 104. Additionally or alternatively, the control circuitry 106 may provide control signals to the actuator 104 to control the power from the power source 102 to rotate the cutting wheel 108 at the target rotational velocity.

Accordingly, the control circuitry 106 may include processing circuitry 110, memory 112, input/output (I/O) interface(s) 114, and/or circuitry 116. The processing circuitry 110 may be any type of processor or logic circuitry that is capable of executing instructions stored in a memory, including the memory 112, and/or otherwise performing logic functions based on inputs. Example processors include central processing units (CPUs), systems-on-a-chip (SOCs), field programmable gate arrays (FPGAs), application-specific integrated circuits (ASICs), discrete logic, and/or any other type of controller, processor and/or, more generally, logic circuitry. The memory 112 may comprise volatile and non-volatile memory, including mass storage devices. The I/O interface 114 is described in more detail below with reference to FIG. 2. The circuitry 116 may comprise various hardware circuitry that may be needed for operation of the control circuitry 106.

One or more of the power source 102, actuator 104, and/or the control circuitry 106 may be combined in different configurations without deviating from the scope of this disclosure.

As disclosed above, the rotational velocity of the cutting wheel 108 may be controlled to provide a substantially constant surface speed at an edge 109 of the cutting wheel 108. Generally, the cutting wheel 108 may get smaller as the abrasive material of the cutting wheel 108 is consumed during the cutting process. Therefore, if the rotational velocity of the cutting wheel 108 remains constant as the cutting wheel 108 gets smaller, the surface speed at the edge 109 of the cutting wheel 108 decreases. Accordingly, the cutting effect may also decrease as the surface speed of the cutting wheel decreases due to reduced efficiency and/or changing cutting characteristic of the cutting wheel 108.

For example, abrasive cutting wheels may operate at a peak efficiency within an envelope of surface speed, relative to speeds outside of the envelope. While users of conventional abrasive cutters may set the rotational velocity of the abrasive saw based on a particular surface speed (e.g., when changing the cutting wheel), the surface speed is only valid within a window of diameters of the abrasive cutting wheel. In contrast, the example cutting device 100 maintains the surface speed substantially constant throughout the life of the abrasive cutting wheel.

In some examples, the control circuitry 106 estimates a diameter of the cutting wheel 108 based on the parameters and duration of use of the cutting wheel 108. For example, a user may register a new cutting wheel with the control circuitry 106 via the I/O interface 114. Following the identification of the new cutting wheel and determining the parameters of the cutting wheel and/or the material under test, the control circuitry 106 tracks the use of the cutting wheel 108 and determines, based on a lookup table and/or an equation, the estimated consumption of the cutting wheel and/or remaining diameter. Based on the remaining diameter, the example control circuitry 106 sets the target speed for the cutting wheel 108 based on Equation 1 below.

$$SFPM=(D)(\pi)(RPM)/12 \qquad \text{(Equation 1)}$$

In Equation 1, SFPM is the linear speed of the outer edge of the cutting wheel 108 in feet per minute, D is the estimated diameter of the cutting wheel in inches, and RPM is the angular velocity in rotations per minute.

Figure 2:
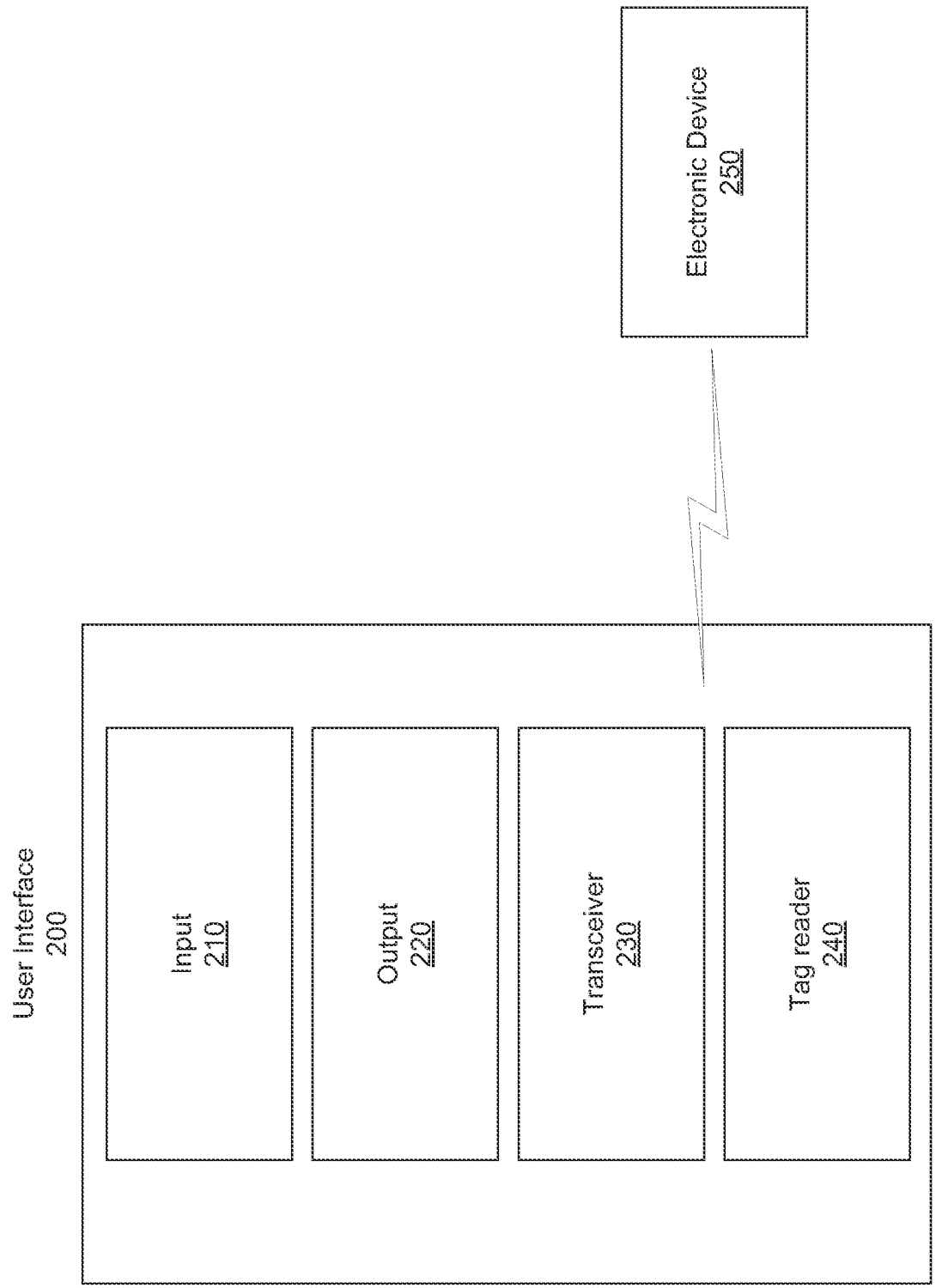
FIG. 2 is block diagram of an example user interface of a cutting device in accordance with aspects of this disclosure.

FIG. 2 is block diagram of an example user interface of a cutting device in accordance with aspects of this disclosure. Referring to FIG. 2, there is shown the example user interface 200 that includes an input interface 210, an output interface 220, and a transceiver 230. The user interface 200 may also include a tag reader 240. The user interface 200 may be used to implement the I/O device 114 of FIG. 1. The user interface 200 may be a part of the cutting device 100, where it is a part of one of the power source 102, the actuator 104, or the control circuitry 106, or may be a separate module. The example input interface 210 may include any type of input device, such as a keyboard, a pointing device (e.g., a mouse, a trackpad), a microphone, a camera (e.g., gesture-based input), a touchscreen, buttons that can be rotated and/or pushed, sliding knobs, and/or any other type of user input and/or output device. The example output interface 220 includes any type of visual output device such as, for example, an LCD display, an LED display, etc., tactile feedback devices that may vibrate, audio output device such as speakers, and/or any other output devices that may be used to provide information or notice. The output interface 220 may display, for example, status/commands that may be entered for the cutting device 100.

The example transceiver 230 communicates via wired and/or wireless communication with other electronic devices. The wired communication may, for example, use any of the different protocols such as, for example, USB, Firewire, TCP/IP, SCSI, IDE, or other protocols that may be appropriate for the cutting device 100. The wireless communication may use any of the different protocols such as, for example, Wi-Fi, Bluetooth, NFC (near field communication), or other protocols that may be appropriate for the cutting device 100.

The transceiver 230 may be used to control and/or view the status of the cutting device 100. For example, an electronic device 250 may be used to enter parameters for the cutting tool, such as, for example, the initial diameter of the cutting wheel, the desired surface speed, etc. The transceiver 230 may also allow tables to be downloaded, for example, to the cutting device 100. Accordingly, by entering parameters such as the sample material being cut, the overall part number of the material being cut, abrasive material type on the abrasive cutting wheel, size of the cutting wheel, concentration of the abrasive material on the abrasive cutting wheel, thickness of the abrasive cutting wheel, bonding agent material type, bonding agent material hardness, type of coolant used (if any), etc., the cutting device 100 may select a recommended surface speed so that the actuator 104 may rotate the cutting wheel 108 at the correct rotational velocity as the cutting wheel 108 changes in size.

Additionally or alternatively, the parameters may be determined by reading electronic indicia on the cutting wheel 108 and/or on the material under test using the tag reader 240. The tag reader 240 may read electronic indicia, such as RFID tags, NFC tags, barcodes, QR codes, etc., which may be present on the cutting wheel, packaging of the cutting wheel, the material under test, and/or an identifier tag attached to the material under test.

The electronic device 250 may also display, for example, status of the cutting device 100 on the electronic device 250. For example, the status may be the status that may be displayed on the output interface 220 and/or other information that may not be displayed on the output interface 220.

FIGS. 3A and 3B illustrate example method to detect a size of a cutting wheel in accordance with aspects of this disclosure. Referring to FIGS. 3A and 3B, there are shown examples of the actuator 104 and the cutting wheel 108. The actuator 104 includes a sensing device 301 that comprises a light source 302 and a sensor 304, and the cutting wheel 108 includes multiple reflectors 306 including reflectors 306a-306d that are configured to reflect light from the light source 302 to the sensor 304. The light source 302 may emits a light that can be easily detected from the ambient light that may be present in an environment where the cutting device 100 is used. The light source 302 may emit, for example, in the infrared spectrum, the ultraviolet spectrum, or the visible light spectrum. The emitted light may also be, for example, modulated as structured light. The emitted light may also be, for example, modulated as structured light. The light source 302 may be one or more LEDs (e.g., an array of LEDs) or any other type(s) of light sources suitable for the purposes. The wavelength of the LEDs or other light source 302 may be selected to enable penetration through coolant and/or coolant vapor.

In operation, the light source 302 may emit light continuously or periodically. The light emission and modulation may be controlled, for example, by the processing circuitry 110 of FIG. 1. The light received by the sensor 304 may be processed, for example, by the processing circuitry 110 to determine which of the multiple reflectors 306a-306d may have reflected the received light.

As the cutting wheel 108 is consumed, some of the reflectors 306a-306d are eliminated from the cutting wheel 108 from the outer edge toward the center, and the number of reflectors 306 is reduced. For example, in FIG. 3A, the outermost of the reflectors 306 is the reflector 306a. However, as the cutting wheel 108 gets smaller, the reflector 306a falls off and the outermost reflector is now the reflector 306b. The processing circuitry 110 may estimate the cutting wheel diameter based on the outermost (e.g., closest to the cutting edge 118) reflector 306b that is identified via the light source 302 and the sensor 304, or the number of reflectors 306 that is detected on, for example, along a radius or a diameter. The light source 302 may adjust its emission such that the emitted light hits only one of the reflectors 306 in turn, or the emitted light may hit all of the available reflectors 306 and the intensity of the received light may determine how many reflectors reflected the light, etc.

Additionally or alternatively, the processing circuitry 110 may compare the wavelength of the light source 302 to the received wavelength to determine Doppler shift. The processing circuitry 110 may then estimate the linear speed of the outermost reflector 306a based on the highest detected Doppler shift. Various embodiments may not use a reflector(s) 306, but may reflect off the surface of the cutting wheel 108. The light may be transmitted to a largest radius of the cutting wheel 108, and then moved toward the center either continuously or by steps until a reflection is detected. The next transmission can then start at the point where the last reflection was detected.

In another embodiment, the cutting wheel 108 may not have reflectors 306 as discrete elements, but the surface of the cutting wheel 108 facing the sensor 304 may be embedded with reflectors 306 that comprise reflective material such that an intensity of light reflected to the sensor 304 may be predictable for different diameters of the cutting wheel 108. Accordingly, the light source 302 may shine light onto a portion or more of the cutting wheel 108, and an intensity of the received light may be processed to determine the size of the reflecting area, and, hence, the diameter of the cutting wheel 108. The reflectors 306 may be embedded uniformly over the surface of the cutting wheel 108, or in specific areas.

While the light source 302 and the sensor 304 are shown as being on the actuator 104, in other examples the light source 302 and/or the sensor 304 may be positioned at other locations such that the reflectors 306 can reflect the light from the light source 302 to the sensor 304.

By determining the diameter of the cutting wheel 108, the rotational velocity of the cutting wheel 108 can be adjusted to provide a substantially constant surface speed. The surface speed over time will depend on how accurate the determination of the diameter of the cutting wheel 108 is. However, the cutting device 100 may also predict the change in rotational velocity based on a history of the change in size of the cutting wheel 108 over time. For example, if the change in size is determined due to measurement at time T1 and time T2, this change rate during this period may be used to adjust the rotational velocity during a period when size determination is not being made.

While some examples for measuring a size of the cutting wheel 108 have been described, any of various other methods that may be applicable can also be used. For example, the reflectors 306 may be lighter colored material or a radial stripe that may be painted white. In some embodiments, additional reflective material may not be embedded in the surface of the cutting wheel 108, but the intensity of light reflected by the surface of the cutting wheel 108 may be used as a baseline when the cutting wheel 108 is first used, and the diminishing intensity of the reflected light may be used to determine the size of the cutting wheel 108.

Another method may be to determine the power needed to rotate the cutting wheel 108 at the present speed and then determine the weight of the cutting wheel 108 based on the power, thereby determining the diameter of the cutting wheel 108. The power may then be increased as needed to increase the rotating speed of the cutting wheel 108. The power needed for a constant rotational velocity may differ when the cutting wheel 108 is not touching the item to be cut as when the cutting wheel 108 is pressed against the item being cut. Accordingly, one way to determine power used for a certain rotational velocity may be when there is a decrease in power used to drive the cutting wheel 108 as this may indicate a reduced load when the cutting wheel 108 has been taken away from the item being cut. The power to drive the cutting wheel 108 may then be a more accurate indication of the power needed to sustain the cutting wheel 108 at that rotational velocity for the purpose of determining the size of the cutting wheel 108.

Other methods may also be used. For example, an estimate may be made of the time that the cutting wheel 108 is driven by the actuator 104 and use a rule that the diameter of the cutting wheel 108 decreases by a certain amount per a given amount of time. This estimate may be made more accurate by keeping track of the time where the actuator 104 is under abnormal load, indicating the time that the cutting wheel 108 is pressed against the item being cut. For example, the time measurement can be for the periods from when power to the actuator 104 increases indicating a heavier load to the time when power to the actuator 104 decreases indicating that the load decreased.

In other examples, the cutting device 100 may use a camera as the sensor 304 to determine the size of the cutting wheel 108. The sensor 304 may be a still camera or a video camera. The image(s) captured by the sensor 304 may be processed to determine the size of the cutting wheel 108. For example, edge detection may be performed to get an outline of the cutting wheel 108 and the outline of the cutting wheel 108 may be compared to a baseline image or a given baseline size of the cutting wheel 108. The image of the cutting wheel 108 may be processed to determine the size of the cutting wheel 108 since the distance from the sensor 304 to the cutting wheel 108 may be constant or otherwise known.

In some other examples, markers are spaced along at least one diameter of the cutting wheel 108. Identification of the markers may allow determination of the size of the cutting wheel 108 (e.g., via the sensor 304, a camera, etc.). The markers may be any items that may be differentiated from the rest of the cutting wheel 108. For example, the markers may be reflective material, different colored material, etc., that may be embedded as a part of the cutting wheel 108 or painted on the cutting wheel 108. The markers may also be, for example, openings in the cutting wheel 108.

Other parts of the electromagnetic spectrum or sound waves may also be used, as appropriate, to perform the tasks similar to those described using light.

Figure 3D:
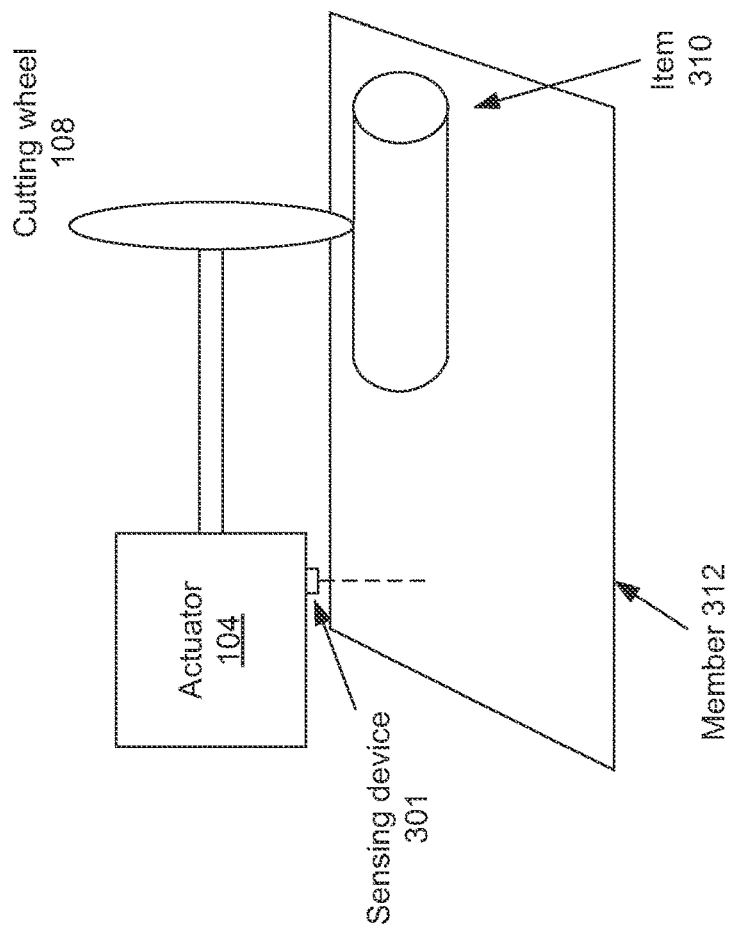
Figure 3C:
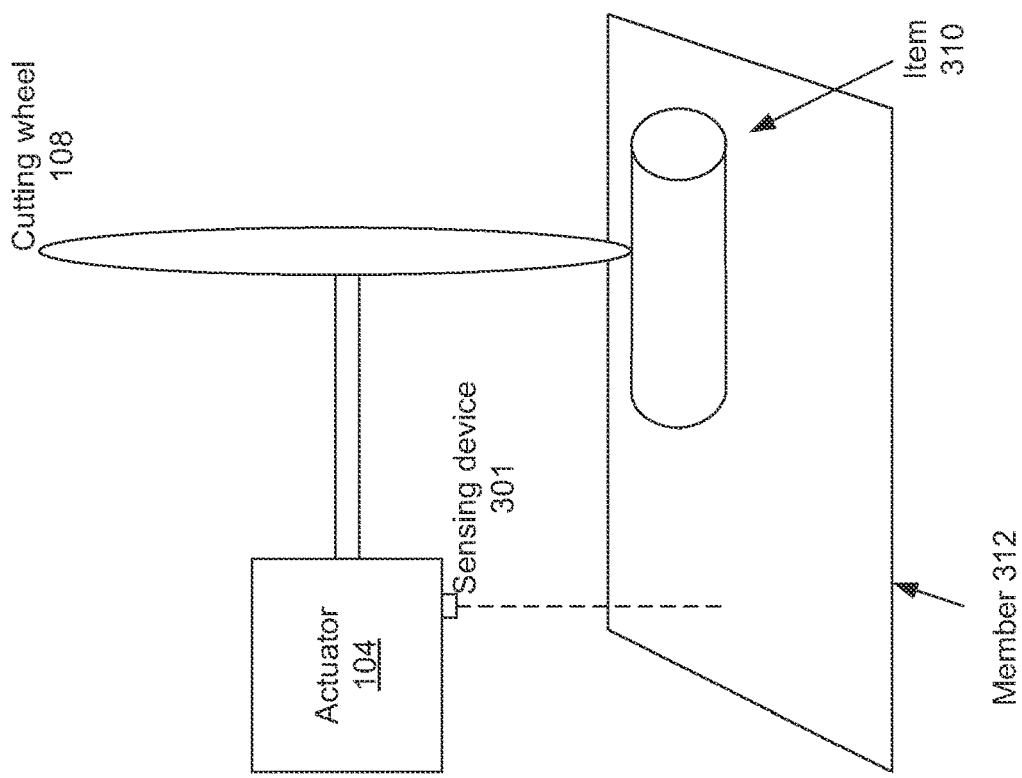

FIGS. 3C and 3D illustrate example methods to detect a size of a cutting wheel in accordance with aspects of this disclosure. Referring to FIGS. 3C and 3D, there are shown the actuator 104, the cutting wheel 108, and an item 310 that is to be cut by the cutting wheel 108 positioned (e.g., clamped) to a member 312. The actuator 104 includes the sensing device 301 to determine a distance to the surface of the member 312. The position and orientation of the surface of the member 312 are assumed to be constant for ease of explanation. However, even if the position and/or the orientation are not constant, the change may be compensated for to determine the distance to the surface from the sensing device 301. The sensing device 301 may comprise a light source 302 that transmits light to reflect off an object, and a sensor 304 that receives the reflection, and processes the reflection to determine distance from the sensor 304 to the object. Accordingly, a distance from the sensing device 301 to the surface of the member 312 can be determined by the time it takes from when the light is transmitted by the transmit portion to when the light is received by the receive portion. This time may be referred to as time-of-flight.

In other examples, the measurement may be made to the surface of the item being cut. For example, if the member 312 is being cut, then the distance to the member 312 is measured if it is more convenient to measure that distance than the distance to another member that may be supporting the member 312. Still other examples may measure the distance to the member 312 and the item 310 supported by the member 312.

As shown in FIG. 3C, the sensing device 301 determines the distance to the surface of the member 312 when the cutting wheel 108 is at its full size as it first starts the cutting process. The initial measurement provides the baseline for determining the diameter of the cutting wheel 108 at later times. At any later point(s) in time, the sensing device 301 may determine the distance to the surface of the member 312 as the cutting wheel 108 decreases in size. Accordingly, the cutting device 100 may be able to determine the diameter of the cutting wheel 108, and, hence, adjust the rotational velocity of the cutting wheel 108.

Figure 3F:
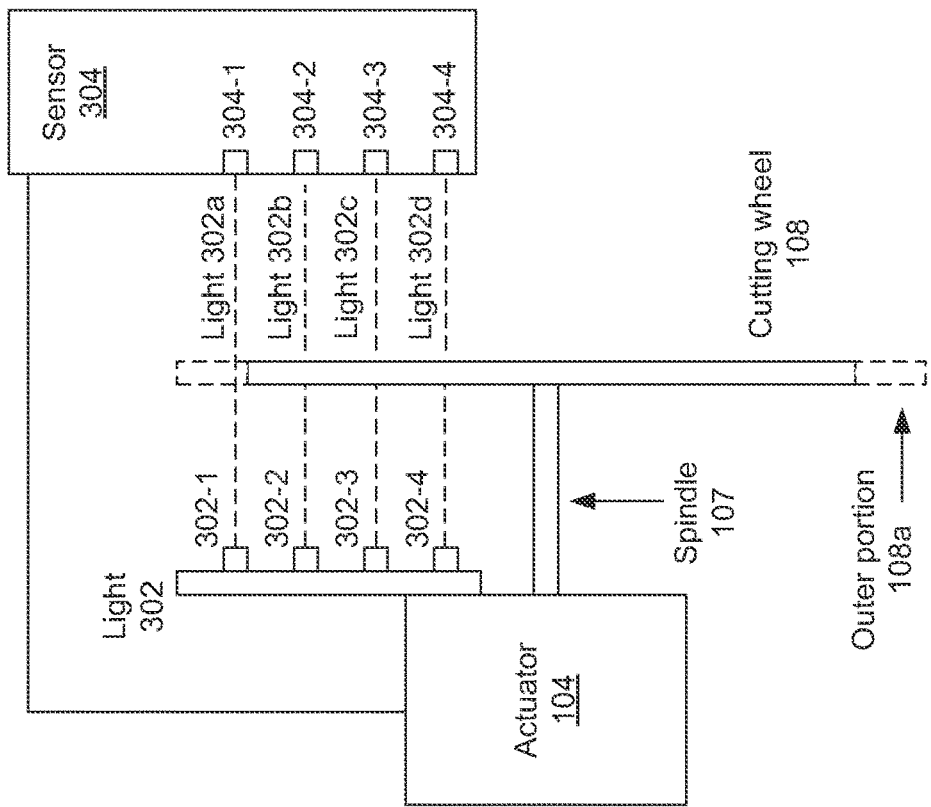
Figure 3E:
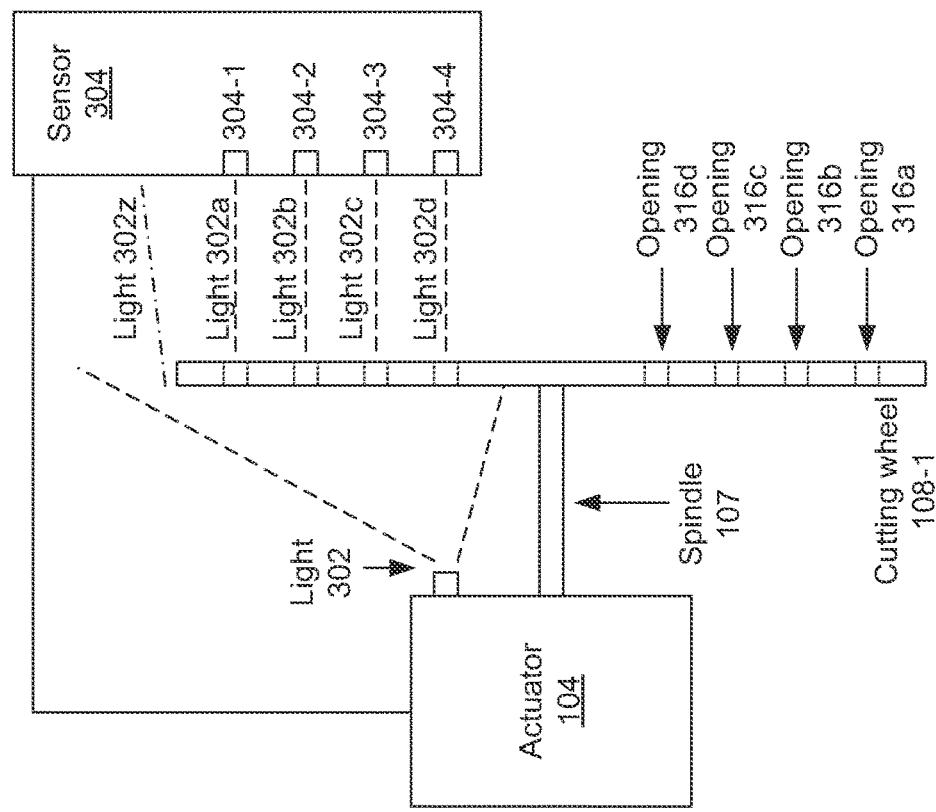

FIG. 3E illustrates an example method to detect a size of a cutting wheel in accordance with aspects of this disclosure. Referring to FIG. 3E, there are shown the actuator 104 and the cutting wheel 108 coupled to the actuator 104 by the spindle 107. The actuator 104 may comprise a light source 302 and a sensor 304. The cutting wheel 108 may comprise openings 316a-316d. The placement, shape, and/or number of the openings 316a-316d may be design dependent for the cutting wheel 108.

The light from the light source 302 may be transmitted through the openings 316a-316d and the beams of light 302a-302d through the holes 316a-316d may be detected by the individual sensors 304-1-304-4. The light from the light source 302 may be transmitted to each of the openings 316a-316d in turn to determine which of the opening are present to direct the light to the sensor 304, or the light may shine through all the openings 316a-316d and light detected by the sensor 304 may determine which openings are still present too determine the size of the cutting wheel 108. Other embodiments may use different number of light sources as shown in FIG. 3F and/or different number of individual sensors. The sensors 304-1 to 304-4 may compare, for example, the light detected to a threshold to determine whether light from the light source 302 has been detected. The threshold may be different for the different ones of the sensors 301-1 to 301-4. This may be, for example, because if there is only one light source, the beam of light 302a may be dimmer than the beam of light 302d.

Various embodiments may not have the openings 316a-316d, and may use the sensor 304 to detect light 302z that is not blocked by the cutting wheel 108. That is, the sensor 304 may detect light 302z that leaks around the edge of the cutting wheel 108.

Other embodiments may use the openings 316a-316d as well as detecting the light 302z that leaks around the edge of the cutting wheel 108.

While light was described as being transmitted, sound or other wavelengths of the electromagnetic spectrum may also be used with an appropriate transmitter and sensor.

Controlling light transmission and processing the received light may be controlled by, for example, the processing circuitry 110 or some other processing circuitry in the cutting device.

FIG. 3F illustrates an example method to detect a size of a cutting wheel in accordance with aspects of this disclosure. Referring to FIG. 3F, there are shown the actuator 104 and the cutting wheel 108 coupled to the actuator 104 by the spindle 107. The actuator 104 may comprise a light source 302 and a sensor 304. The cutting wheel 108 of FIG. 3F may not have openings for light to shine through.

The light source 302 may comprise individual lights 302-1, 302-2, 302-3, and 302-4, which may project narrow beams that can be individually detected by the corresponding individual sensors 304-1, 304-2, 304-3, and 304-4. For example, the beam of light 302a from the individual light 302-1 may be blocked by the outer portion 108a of the cutting wheel 108 when the cutting wheel 108 is new. However, as the cutting wheel 108 is used, the outer portion 108a may be worn away to allow the beam of light 302a to be detected by the sensor 304-1. As the cutting wheel 108 is used even more, the outer portion 108a may get larger (worn away). Accordingly, for example, the processing circuitry 110 may be able to determine the size of the cutting wheel 108 by knowing which of the sensors 304-1 to 304-4 detect light. As the cutting wheel 108 wears away more, the sensors 304-2, 304-3, and 304-4 may also be able to detect the beams of light 302b, 302c, and 302d, respectively. Similarly as for FIG. 3E, there may be thresholds for light detected by the sensors 304-1 to 304-4.

While light was described as being transmitted, sound or other wavelengths of the electromagnetic spectrum may also be used with an appropriate transmitter and sensor.

Controlling light transmission and processing the received light may be controlled by, for example, the processing circuitry 110 or some other processing circuitry in the cutting device.

Therefore, as can be seen, various embodiments may be used to detect light and/or sound to determine the size of the cutting wheel.

Figure 3H:
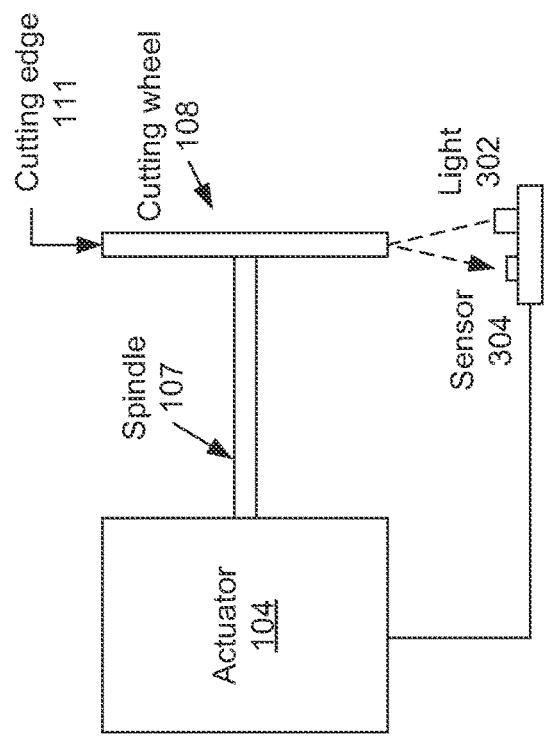
Figure 3G:
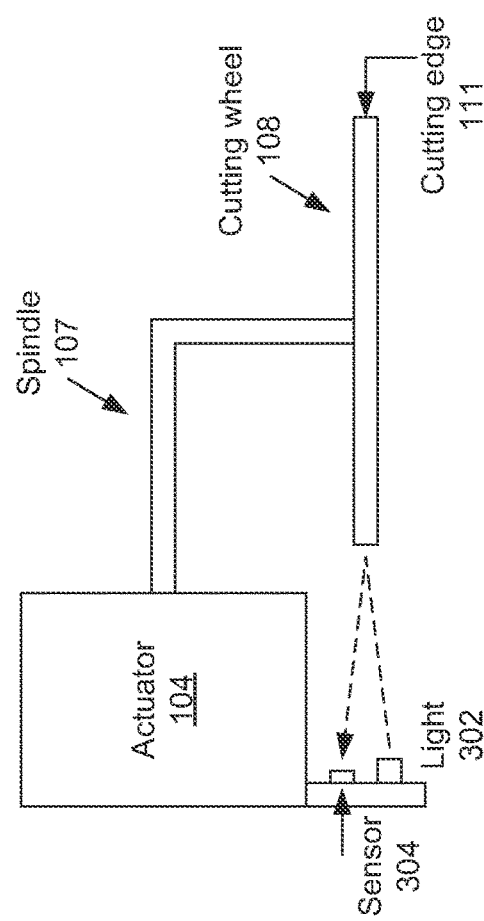

FIGS. 3G and 3H illustrate example methods to detect a size of a cutting wheel in accordance with aspects of this disclosure. Referring to FIGS. 3G and 3H, there are shown the actuator 104 and the cutting wheel 108 coupled to the actuator 104 by the spindle 107. While FIG. 3G shows the spindle 107 to be at a right angle, other angles may also be used. When the spindle 107 has an angle as shown in FIG. 3G, the spindle 107 includes appropriate gears (not shown) to allow the spindle to be angled.

The light source 302 may transmit light to the cutting edge 111 of the cutting wheel, and the sensor 304 may detect the reflected light from the cutting edge 111. Accordingly, the size of the cutting wheel 108 may be determined. As the cutting wheel 108 wears down with use, the distance to the cutting edge 111 increases. Therefore, as the initial distance to the cutting wheel 108 and the initial size of the cutting wheel 108 are known, subsequent sizes of the cutting wheel 108 can be determined as the distance to the cutting edge 111 changes.

Also, as shown in FIG. 3H, the spindle may be straight, and the light source 302 and the sensor 304 may be placed appropriately to determine the size of the cutting wheel 108.

Therefore, it can be seen that any of a number of different methods may be used to determine a size of the cutting wheel 108 so as to adjust its rotational velocity to keep the surface speed constant. These various calculations/estimations may be made by, for example, the control circuitry 106 with appropriate information from the sensor 304, the actuator 104, power source 102, etc. The methods of determining the diameter of the cutting wheel 108 may be grouped into, for example, two groups. The first group may be referred to as the direct method and the second group may be referred to as the indirect method.

The direct method may use information directly regarding the cutting wheel 108 such as, for example, by using light reflection from the cutting wheel 108. The indirect method may use information not directly regarding the cutting wheel 108. For example, the information may be a distance from the sensor 304 to the surface of the item being cut or to the surface of a supporting member that supports the item being cut, the power used to drive the cutting wheel 108, etc.

The size of the cutting wheel 108 may be determined continuously or periodically. The size determination may also be performed at any time using, for example, the user interface 200, where the determination may be requested using the input interface 210 or a remote electronic device 240.

Figure 4:
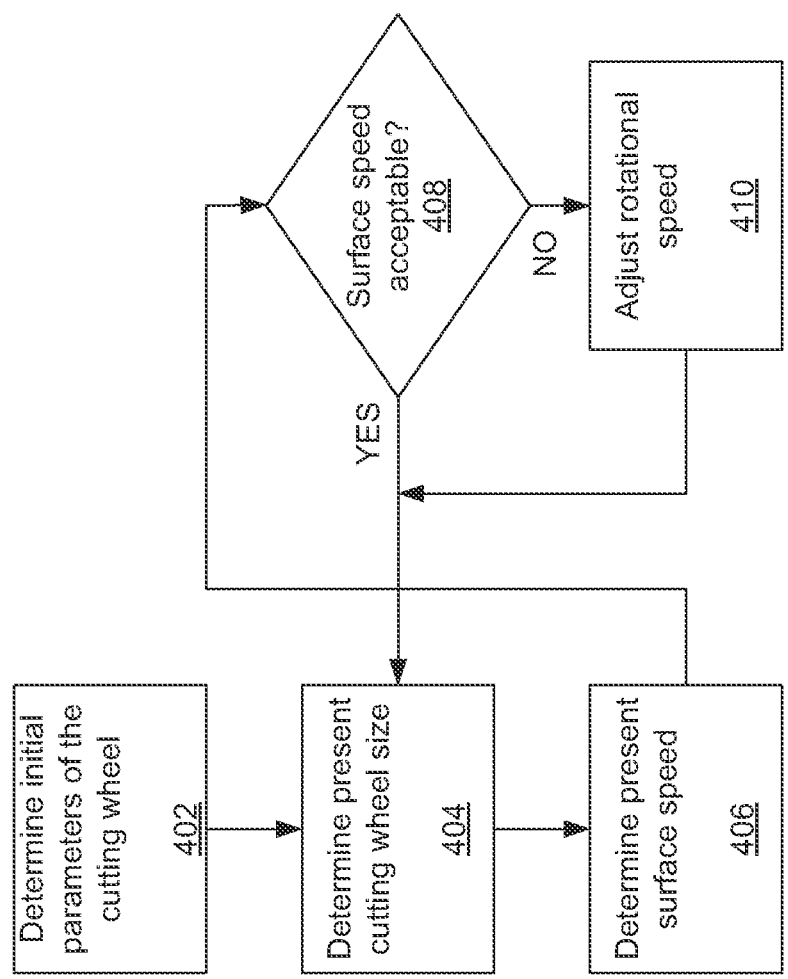
FIG. 4 is a flow diagram illustrating an example method to control a surface speed of a cutting wheel in accordance with aspects of this disclosure.

FIG. 4 is a flow diagram illustrating an example method to control a surface speed of a cutting wheel in accordance with aspects of this disclosure. Referring to FIG. 4, there is shown a flow diagram 400 with blocks 402 to 410. The example method shown in the flow diagram 400 may be used to implement the control circuitry 106 of FIG. 1 to control the actuator 104 and/or the power source 102. For example, the example method may be implemented using machine readable instructions, which may be stored in the memory 112 and/or executed by the processing circuitry 110. The example method is described below with reference to the cutting device 100 of FIG. 1.

In block 402, the control circuitry 106 determines the initial parameters associated with the cutting wheel 108. For example, the parameters may include the item being cut, the overall part number of the item being cut, an abrasive material type on the cutting wheel, a size of the cutting wheel, a concentration of the abrasive material on the cutting wheel, a thickness of the cutting wheel, a bonding agent material type, and/or a bonding agent material hardness. Determination of the parameters may be done by a user entering the size directly or entering an identifier for the cutting wheel 108 and/or by recognition of electronic indicia associated with the cutting wheel 108 and/or the item to be cut based on the identifier(s), in which the cutting device 100 may look up the parameter(s) of the cutting wheel 108 and/or the item to be cut based on the identifier(s). The information may be entered or read using, for example, the user interface 200 either locally via the input interface 210 and/or the tag reader 250, or remotely via the electronic device 240 and/or the tag reader 250.

The present size of the cutting wheel 108 may also be determined using any of the methods described in this disclosure, or any other methods that may be applicable for determining a size of the cutting wheel 108. The desired surface speed may also be similarly entered, or the identifier for the cutting wheel 108 and/or the entered characteristics of the item to be cut may be used to determine a desired surface speed.

The determination may be performed, for example, by the processing circuitry 110 in the control circuitry 106, or any other capable processor that may be a part of the cutting device 100.

At block 404, the control circuitry 106 determines the present size of the cutting wheel 108. This may be done upon a prompt by a user or another person or device, periodically, or continuously. At block 406, the control circuitry 106 determines the surface speed of the cutting wheel 108 based on the present size of the cutting wheel 108. The surface speed SFPM may be determined using Equation 1 above: SFPM=(D)($\pi$)(RPM)/12.

A value of 3.14 is used for $\pi$, D is the diameter of the cutting wheel 108, and RPM is the rotational velocity of the cutting wheel 108 per unit time. Accordingly, a cutting wheel 108 with an initial diameter of 18 inches rotating at 1860 RPM has a an SFPM of $\pi$(18)(1860)/12=8,761 feet/minute. It should be noted that a larger number of decimal places can be used for $\pi$ for greater accuracy.

After some time, the diameter of the cutting wheel 108 may be, for example, 16 inches. Without adjusting the rotational velocity to compensate for the smaller diameter, the surface speed is now 7787 feet/minute, or about 11% less than the desired surface speed.

At block 408, this surface speed may be compared to the desired surface speed, and the rotational velocity of the cutting wheel 108 may be adjusted as needed. If the surface speed is within a desired tolerance and does not need to be adjusted, the next step may be to block 404. If the surface speed needs to be adjusted to be within a desired tolerance, such as, for example, 1%, then the next step may be at block 410.

At block 410 the rotational velocity may be increased to, for example, 2093 RPM, resulting in a surface speed of 8759 feet/minute. The next step may be to block 404 to again determine the size of the cutting wheel 108.

The cutting device 100 described above provides a general description for the sake of brevity, and other types of cutting devices that have other configurations may also be used without deviating from the scope of the disclosure. Accordingly, the cutting device 100 may comprise other blocks/functions without deviating from the scope of the disclosure. While various embodiments are described, other embodiments may also be used in accordance of this disclosure.

Additionally, while a specific example flow diagram is described, other flow diagrams may also be implemented for the use of the cutting device 100. For example, since Equation 1 is a linear equation, the present diameter (or radius) may be compared to the baseline diameter (radius) to determine whether the rotational velocity should be adjusted. Or, when an intensity of light is used to determine the diameter of the cutting wheel 108, the intensity may be used directly to be compared to a baseline intensity for the cutting wheel 108, if applicable.

Figure 5:
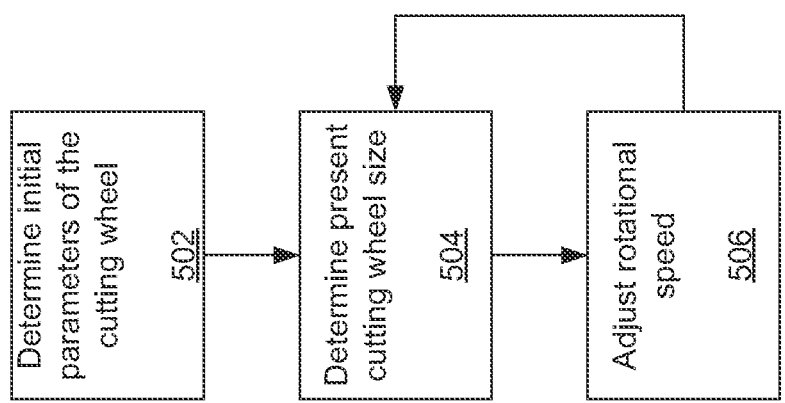
FIG. 5 is a flow diagram illustrating another example method to control a surface speed of a cutting wheel in accordance with aspects of this disclosure.

FIG. 5 is a flow diagram illustrating another example method to control a surface speed of a cutting wheel in accordance with aspects of this disclosure. FIG. 5 is a flow diagram illustrating an example method to control a surface speed of a cutting wheel in accordance with aspects of this disclosure. Referring to FIG. 5, there is shown a flow diagram 500 with blocks 502 to 506. The example method shown in the flow diagram 500 may be used to implement the control circuitry 106 of FIG. 1 to control the actuator 104 and/or the power source 102. For example, the example method may be implemented using machine readable instructions, which may be stored in the memory 112 and/or executed by the processing circuitry 110. The example method is described below with reference to the cutting device 100 of FIG. 1.

In block 502, the control circuitry 106 determines the initial parameters associated with the cutting wheel 108 in a manner similar to that described in block 402 of FIG. 4. For example, the parameters may include the item being cut, the overall part number of the item being cut, an abrasive material type on the cutting wheel, a size of the cutting wheel, a concentration of the abrasive material on the cutting wheel, a thickness of the cutting wheel, a bonding agent material type, and/or a bonding agent material hardness. Determination of the parameters may be done by a user entering the size directly or entering an identifier for the cutting wheel 108 and/or by recognition of electronic indicia associated with the cutting wheel 108 and/or the item to be cut based on the identifier(s), in which the cutting device 100 may look up the parameter(s) of the cutting wheel 108 and/or the item to be cut based on the identifier(s). The information may be entered or read using, for example, the user interface 200 either locally via the input interface 210 and/or the tag reader 250, or remotely via the electronic device 240 and/or the tag reader 250.

The present size of the cutting wheel 108 may also be determined using any of the methods described in this disclosure, or any other methods that may be applicable for determining a size of the cutting wheel 108. The desired surface speed may also be similarly entered, or the identifier for the cutting wheel 108 and/or the entered characteristics of the item to be cut may be used to determine a desired surface speed.

The determination may be performed, for example, by the processing circuitry 110 in the control circuitry 106, or any other capable processor that may be a part of the cutting device 100.

At block 504, the control circuitry 106 determines the present size of the cutting wheel 108. This may be done upon a prompt by a user or another person or device, periodically, or continuously.

At block 506 the rotational velocity is controlled to correspond to the target surface speed. The next step may be to block 504 to again determine the size of the cutting wheel 108.

Figure 6:
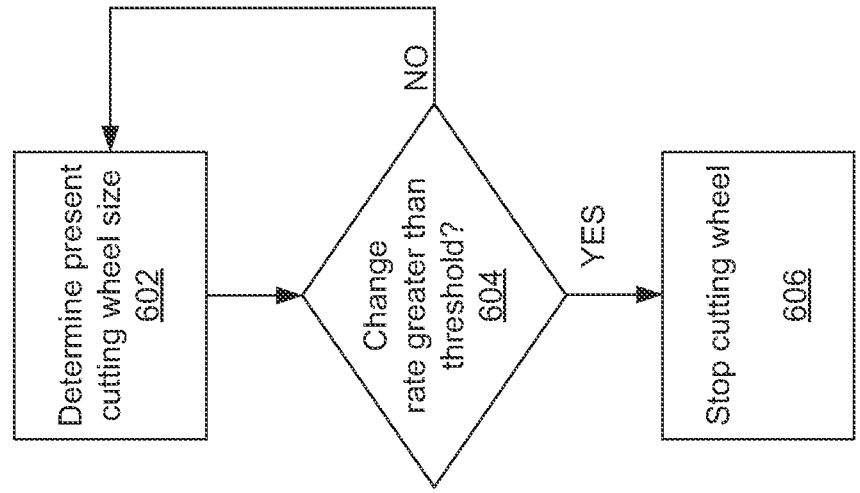
FIG. 6 is a flow diagram illustrating an example method of controlling operation of a cutting wheel in accordance with aspects of this disclosure.

FIG. 6 is a flow diagram illustrating an example method of controlling operation of a cutting wheel in accordance with aspects of this disclosure. Referring to FIG. 6, there is shown the flow diagram 600 with blocks 602 to 606. At block 602, the present cutting wheel size is determined. The determination may be performed using any of the various methods described above, or any other method suitable method.

At block 604, a rate of change in size of the cutting wheel 108 may be determined by comparing the present size with a previous size. If the change in size over time (change rate) is larger than a threshold rate, then the cutting wheel 108 may be stopped at block 606. This may be due to, for example, a concern that the cutting wheel 108 may have broken, shattered, etc. If the change rate is not greater than the threshold rate, then the cutting wheel size may be determined again at block 602. The size determination may be continuous, at some periodic rate, on demand, etc.

Depending on the change rate, a warning may be provided to the user of the cutting device 100 that comprises the cutting wheel 108. For example, if the change rate is less than a first threshold rate, but above a second threshold rate, then a warning may be provided that the cutting wheel 108 is getting smaller than expected during its use.

Additionally, while light was given as an example, other wavelengths of the electromagnetic spectrum, sound waves, etc. may also be used as appropriate for determining speed and/or distance, as well as presence of a marker. Accordingly, various embodiments of the disclosure may use any appropriate method to determine a diameter of the cutting wheel 108 and/or the surface speed of the cutting wheel 108 to control the rotational velocity of the cutting wheel 108.

Various embodiments of the disclosure may disclose a method for controlling a rotational velocity of a cutting device by determining a present diameter of a cutting wheel of the cutting device, and adjusting a rotational velocity of the cutting wheel based on the present diameter to have a surface speed of the cutting wheel at substantially a predetermined constant surface speed. The present diameter may be determined upon demand by a user of the cutting device or periodically without user input. The present diameter may be determined by, for example, detecting one or both of: light or sound reflected from at least one reflector of the cutting wheel, light or sound reflected from an area of the cutting wheel, light reflected from the edge of the cutting wheel, and/or light reflected from and/or received on an opposite side of the cutting wheel from the light. The light or sound may be transmitted, for example, by a source on a first side of the cutting wheel toward the cutting wheel and received by a sensor on a second side of the cutting wheel.

The present diameter may also be determined by determining an amount of power used to maintain a present rotational velocity. The power used may be any of different suitable powers, such as, for example, electric power. The indirect measurement may also comprise, for example, determining a distance from a sensor to a surface of an item being cut by the cutting wheel and/or a distance to a surface of a member supporting the item being cut, and the distance may be used to determine the present diameter of the cutting wheel.

The present diameter may also be estimated based on an amount of time the cutting device is in operation. For example, the cutting wheel may be assumed to decrease in size by a certain amount for each minute the cutting device is in operation, and the known initial diameter may be reduced appropriately. The initial diameter may be known because the diameter may be entered prior to operation or the diameter may be looked up based on identifier of the cutting wheel being entered prior to operation.

Similarly, the present diameter may be estimated based on an amount of time the cutting wheel is in contact with an item being cut, and a diameter of the cutting wheel may be known prior to a first contact with the item being cut as explained above.

The present diameter may be compared with a previous diameter, and a change rate of the diameter may be determined. When the change rate is greater than a first threshold, the rotational velocity of the cutting wheel may be adjusted to zero. A warning may be provided when the change rate is less than or equal to the first threshold and greater than or equal to a second threshold.

The constant surface speed may be one of a plurality of constant surface speeds, where each of a plurality of constant surface speeds may be correlated to, for example, a type of material being cut. Various other parameters may also be used to determine a desired surface speed.

Various embodiments of the disclosure may disclose a cutting device that comprises a cutting wheel, an actuator to rotate the cutting wheel, a power source configured to provide power to the actuator for rotating the cutting wheel at an adjustable rotational velocity, and control circuitry configured to adjust the rotational velocity of the cutting wheel to maintain a substantially constant surface speed.

The constant surface speed may be one of a plurality of constant surface speeds. The control circuitry may be configured to determine a present diameter of the cutting wheel based on power needed to rotate the cutting wheel at a present rotational velocity. The control circuitry may also be configured to adjust the rotational velocity of the cutting wheel based on the present diameter to maintain a substantially constant surface speed of the cutting wheel.

A sensor may be configured to determine a distance from the sensor to a surface of an item being cut by the cutting wheel and/or a distance to a surface of a member supporting the item being cut, wherein the distance may be used to determine the present diameter of the cutting wheel. The sensor may be configured to detect one or both of light or sound reflected from at least one reflector of the cutting wheel, and light or sound reflected from an area of the cutting wheel.

Various embodiments of the disclosure may also disclose a method for controlling a rotational velocity of a cutting device by determining a present surface speed of a cutting wheel of the cutting device, and adjusting a rotational velocity of the cutting wheel based on the present surface speed to have a surface speed of the cutting wheel at substantially a pre-determined constant surface speed.

Accordingly, the present methods and systems may be realized in hardware, software, and/or a combination of hardware and software. The present methods and/or systems may be realized in a centralized fashion in at least one computing system or in a distributed fashion where different elements are spread across several interconnected computing systems. Any kind of computing system or other apparatus adapted for carrying out the methods described herein is suited. A combination of hardware and software may include a general-purpose computing system with a specific program or other code that, when being loaded and executed, controls the computing system such that it carries out the methods described herein. Another implementation may comprise one or more application specific integrated circuit or chip designed for cutting/abrading tools. Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") that may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, "and/or" means any one or more of the items in the list joined by "and/or." As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y and z." As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A cutting device, comprising:
an actuator configured to rotate a cutting wheel;
a power source configured to provide power to the actuator for rotating the cutting wheel at an adjustable rotational velocity; and
control circuitry configured to adjust the rotational velocity of the cutting wheel to maintain a substantially constant surface speed,
wherein the control circuitry is configured to provide a warning when a change rate for a diameter of the cutting wheel is greater than a first threshold, and to adjust the rotational velocity of the cutting wheel to zero when the change rate is greater than a second threshold that is greater than the first threshold.

2. The cutting device of claim 1, wherein the constant surface speed is one of a plurality of constant surface speeds.

3. The cutting device of claim 1, wherein the control circuitry is configured to determine a present diameter of the cutting wheel based on power drawn by the actuator to rotate the cutting wheel at a present rotational velocity.

4. The cutting device of claim 1, wherein the control circuitry is configured to adjust the rotational velocity of the cutting wheel based on a present diameter to maintain a substantially constant surface speed of the cutting wheel.

5. The cutting device of claim 1, further comprising a sensor configured to determine a distance from the sensor to at least one of a surface of an item being cut by the cutting wheel and a member supporting the item, wherein the distance is used to determine a present diameter of the cutting wheel.

6. The cutting device of claim 5, further comprising a sensor configured to detect one or both of:
light or sound reflected from at least one reflector of the cutting wheel; and
light or sound reflected from the cutting wheel.

7. The cutting device of claim 1, wherein the control circuitry is configured to determine a present diameter of the cutting wheel based on an amount of time the cutting device is in operation.

8. The cutting device of claim 1, wherein the control circuitry is configured to determine a present diameter of the cutting wheel based on an amount of time the cutting wheel is in contact with an item being cut.

9. The cutting device of claim 1, wherein the constant surface speed is correlated to a type of material being cut.

10. A cutting device, comprising:
an actuator configured to rotate a cutting wheel;
a power source configured to provide power to the actuator for rotating the cutting wheel at an adjustable rotational velocity; and
control circuitry configured to:
determine a present diameter of a cutting wheel of the cutting device;
adjust a rotational velocity of the cutting wheel based on the present diameter to have a surface speed of the cutting wheel at substantially a pre-determined constant surface speed;
provide a warning when a change rate for a diameter of the cutting wheel is greater than a first threshold; and
adjust the rotational velocity of the cutting wheel to zero when the change rate is greater than a second threshold that is greater than the first threshold.

11. The cutting device of claim 10, wherein the present diameter is determined upon demand by a user of the cutting device or periodically without user input.

12. The cutting device of claim 10, wherein the constant surface speed is one of a plurality of constant surface speeds.

13. The cutting device of claim 10, wherein determining the present diameter comprises detecting one or both of:
light or sound reflected from at least one reflector of the cutting wheel, and
light or sound reflected from the cutting wheel.

14. The cutting device of claim 10, wherein determining the present diameter comprises determining an amount of power drawn by the actuator to rotate the cutting wheel at a present rotational velocity.

15. The cutting device of claim 10, wherein the determining the present diameter comprises determining a distance from a sensor to at least one of a surface of an item being cut by the cutting wheel and a member supporting the item, and the distance is used to determine the present diameter of the cutting wheel.

16. The cutting device of claim 10, wherein the present diameter is determined based on one or both of:
(i) an amount of time the cutting device is in operation and an initial diameter of the cutting wheel when the cutting device starts the operation; and
(ii) an amount of time the cutting wheel is in contact with an item being cut and an initial diameter of the cutting wheel prior to a first contact with the item being cut.

17. A cutting device, comprising:
an actuator configured to rotate a cutting wheel;
a power source configured to provide power to the actuator for rotating the cutting wheel at an adjustable rotational velocity; and
control circuitry configured to:
determine a present diameter of a cutting wheel of the cutting device;
adjust a rotational velocity of the cutting wheel based on the present diameter to have a surface speed of the cutting wheel at substantially a pre-determined constant surface speed;
compare the present diameter with a previous diameter;
determine a change rate of the present diameter;
when the change rate is greater than a first threshold, adjust the rotational velocity of the cutting wheel to zero; and
provide a warning when the change rate is less than or equal to the first threshold and greater than or equal to a second threshold.

* * * * *